US008452632B2

United States Patent
Perrella et al.

(10) Patent No.: US 8,452,632 B2
(45) Date of Patent: *May 28, 2013

(54) LOCATION AND TIME SENSITIVE WIRELESS CALENDARING

(75) Inventors: Ronald Perrella, Dunwoody, GA (US); Jai Menon, Alpharetta, GA (US); Gaiye Zhou, Duluth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,473

(22) Filed: Feb. 27, 2012

(65) Prior Publication Data
US 2012/0158448 A1    Jun. 21, 2012

Related U.S. Application Data

(63) Continuation of application No. 12/880,746, filed on Sep. 13, 2010, which is a continuation of application No. 11/592,656, filed on Nov. 3, 2006, now Pat. No. 7,813,950, which is a continuation of application No. 09/892,730, filed on Jun. 27, 2001, now Pat. No. 7,139,722.

(51) Int. Cl.
*G06Q 10/00* (2012.01)

(52) U.S. Cl.
USPC ....................................... 705/7.19

(58) Field of Classification Search
USPC ....................................... 705/7.19
See application file for complete search history.

(56) References Cited

U.S. PATENT DOCUMENTS

| | | | | |
|---|---|---|---|---|
| 5,790,974 | A * | 8/1998 | Tognazzini | 455/456.5 |
| 5,938,721 | A * | 8/1999 | Dussell et al. | 701/468 |
| 5,963,913 | A * | 10/1999 | Henneuse et al. | 705/7.13 |
| 6,163,274 | A * | 12/2000 | Lindgren | 340/7.29 |
| 6,263,209 | B1 * | 7/2001 | Reed et al. | 455/456.3 |
| 6,360,101 | B1 * | 3/2002 | Irvin | 455/456.6 |
| 6,385,531 | B2 * | 5/2002 | Bates et al. | 701/117 |
| 6,732,080 | B1 | 5/2004 | Blants | |
| 6,898,569 | B1 * | 5/2005 | Bansal et al. | 705/7.16 |
| 6,999,572 | B1 * | 2/2006 | Shaffer et al. | 379/210.01 |
| 7,139,722 | B2 | 11/2006 | Perrella et al. | |

OTHER PUBLICATIONS

BellSouth Cellular will Evaluate SigmaOne Communications' Sigma 5000 AMPS-TDMA Wireless Location System. PR Newswire. New York: Nov. 17, 1999. p. 1 (ProQuest).

Zsigo, Konstantin J., "Fusing phones & Computers; cellular phones become more valuable in the mobile environment when you consider maximizing computer capabilities", Jan. 1992, Cellular Business v9, n1, p. 28(2), Dialog 05758037 11826905.

(Continued)

*Primary Examiner* — Johnna Loftis
(74) *Attorney, Agent, or Firm* — Parks IP Law LLC; Jennifer P. Medlin, Esq.

(57) ABSTRACT

A computer-implemented method provides location-sensitive and time-sensitive calendaring to a wireless device, such as a cell phone, pager, PDA, etc. A user's calendar is maintained with a number of appointments, start times and end times for the appointments, meeting place and a list of attendees for the appointments. When the present time reading is within a predetermined minimum of a meeting start time of an appointment of a calendar user, the location of the user is determined based on the location of the wireless device. The location of the meeting place is also determined. Using historical data (of the user or others), the estimated time of arrival of the user at the meeting place is determined. If the estimated time of arrival is after the meeting start time, then a late message may be sent to the user and/or to the other meeting attendees.

20 Claims, 2 Drawing Sheets

OTHER PUBLICATIONS

Trembly, Ara C., Wireless products arm road warrior, Jan. 2011, National Underwriter, v105n3, pp. 23-25, Dialog 02113577 067213220.

Buxbaum, Peter, Utility fleet opts for upgraded communications, Feb. 2000, Fleet Equipment, v26n2, pp. bm1-bm3, Dialog 01992437 50557019.

Harrington, Lisa H., "High Tech trucking improves fleet performance", Oct. 1999, Transportation and Distribution, v40n10, pp. 53-62, Dialog 01913932 05-64924.

Business Wire, "InfoMove Partners with Etak and University of Washington to Deliver Real-Time Traffic Information to the Car via Wireless Internet", Jan. 2000, p. 0141, Dialog 06905260 58431076.

"Briefs", Dec. 1999, Global Positioning & Navigation News, v8, n25, p. NA, Dialog 06021134 53440986.

M2 Presswire, Palm, Inc.: Palm makes Internet personal and portable with MyPalm portal; New Wireless content and services to be imitated in public beta; Palm building mobile PIM-centric Portal, M2 Presswires, Nov. 14, 2000 (Proquest).

\* cited by examiner

LOCATION AND TIME SENSITIVE WIRELESS CALENDARING

CROSS-REFERENCE TO RELATED APPLICATIONS

This application is a continuation of U.S. application Ser. No. 12/880,746, filed Sep. 13, 2010, which is a continuation of U.S. application Ser. No. 11/592,656, filed Nov. 3, 2006 (now U.S. Pat. No. 7,813,950), which is a continuation of U.S. application Ser. No. 09/892,730, filed Jun. 27, 2001 (now U.S. Pat. No. 7,139,722), the entireties of which are herein incorporated by reference.

TECHNICAL FIELD

This invention relates to a computer-implemented method and system for providing location and time sensitive wireless calendaring information to users.

BACKGROUND OF THE INVENTION

Calendaring software programs and personal information managers have greatly simplified the task of maintaining contacts and scheduling appointments. Time is an important aspect of calendaring software programs. Typically, an appointment or task has a start time and an end time. An appointment may also have a list of attendees. A reminder may be sent to the user of the calendaring program to remind the user when an appointment is approaching. One aspect that is lacking in calendaring programs is location. Calendaring programs do not provide functionality to users based on the user's present location.

Wireless devices with GPS capability (or a similar capability) are able to provide location information to a user. Unfortunately, these devices lack the ability to tie the user's location to a user's appointment information (in a calendar).

Thus, there is a need for a computer-implemented method and system for providing location and time-sensitive wireless calendaring information to users.

SUMMARY OF THE INVENTION

The present invention satisfies the above described needs by providing, in one embodiment, a computer-implemented method for providing location-sensitive and time-sensitive calendaring to a wireless device, such as a cell phone, pager, personal digital assistant (PDA), etc. A user's calendar is maintained in a calendar program module with a number of appointments, start times and end times for the appointments, meeting places and a list of attendees for the appointments. When the present time reading is within a predetermined minimum of a meeting start time of an appointment of a calendar of a user, the location of the user is determined based on the location of the wireless device. The location of the meeting place is also known. Using historical data (of the user or others), the estimated time of arrival of the user at the meeting place is determined. If the estimated time of arrival is after the meeting start time, then a late message may be sent to the wireless devices of the user and/or to the other meeting attendees.

In one embodiment, the computer-implemented calendar program may be maintained in the wireless device itself. For example, the calendar program may be part of a personal digital assistant (PDA). In another embodiment, the calendar program may be maintained on a server connected to a wireless network. Multiple users, such as corporate users, may be associated with the server.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
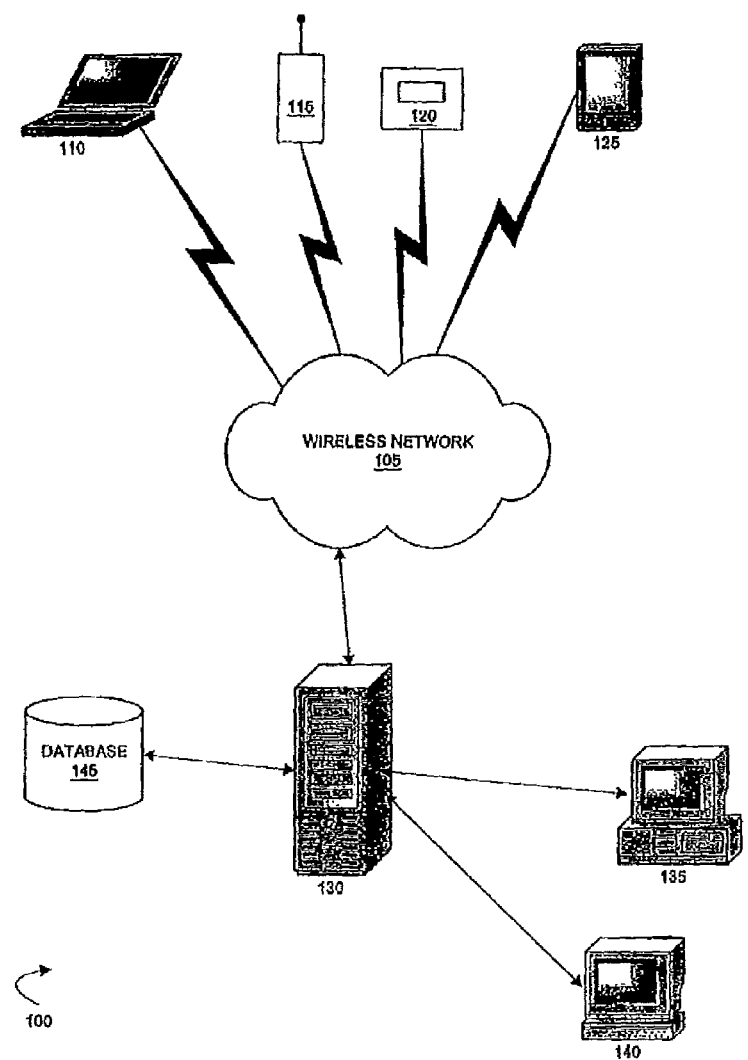
FIG. 1 is a block diagram of an exemplary operating environment 100 in accordance with an embodiment of the present invention.

The present invention is directed toward a method and system for using position information to augment a calendaring application. Positions of wireless devices may be tracked over time to produce commute statistics. Each wireless device is typically associated with a user. The commute statistics and current position of the user may be used to predict whether the user will be late for a scheduled appointment. If so, then a message may be transmitted to the user and/or the other scheduled attendees of the meeting to notify them that the user will be late to the meeting. The message may also schedule a follow-up meeting at a later time when the user is scheduled to arrive. The invention may also be used for a roll call function so that a user may submit a roll call request and receive the current locations and/or approximate arrival times of the scheduled attendees for a meeting.

Referring now to the drawings, in which like numerals represent like elements throughout the several figures, aspects of the present invention and the exemplary operating environment will be described.

FIG. 1 is a block diagram of an exemplary operating environment 100 in accordance with an embodiment of the present invention. The environment 100 comprises a plurality of wireless devices connected to a wireless network 105. The wireless network may be any type of wireless network known to those skilled in the art such as a cellular network or a personal communications service (PCS) network. The wireless devices may be any of those known to those skilled in the art, such as a laptop computer 110 with a wireless connection (such as a wireless modem), a wireless telephone 115, a pager 120 or a personal digital assistant (PDA) 125 with a wireless connection (such as a wireless modem). The wireless devices send and receive wireless transmissions, such as radio signals, via wireless network 105.

It should be understood that wireless network 105 is any wireless network known to those skilled in the art and may include well-known components such as cell towers, mobile switching centers (MSCs), and the like.

The wireless network 105 is also connected to a server 130, preferably via a wireline connection. When the server 130 wants to send a message to one of the wireless devices, the server may transmit the message via the wireline connection to the wireless network. The wireless network may then transmit the message to the appropriate wireless device. The message may be any wireless message known to those skilled in the art, such as a short messaging service (SMS) message, an HTTP message or a voice message (using text-to-speech converters).

The server 130 is also connected to a computer 135 and/or a workstation 140. The server 130 may also be connected to a database 145.

A calendaring program (not shown) may be run on the server 130, on the computer 135 and/or workstation 140. A user operating computer 135, workstation 140 or a similar component connected to server 130 may use the calendaring program to schedule appointments, tasks and meetings. Associated with the appointments, tasks and/or meetings may be a number of attendees, a start time, and a meeting location. A separate calendar may be maintained for each user of the server. The server may be operated in a local area network (LAN) configuration, a wide area network (WAN) configuration or any other configuration known to those skilled in the art.

The database 145 may comprise a list of all users, their associated calendars and their associated wireless devices. When the server 130 needs to locate a user, the server determines the wireless device associated with the user and it sends a request message to the wireless network 105. The wireless network locates the user based on the user's wireless device and sends the location information back to the server 130. The location information may be latitude and longitude information, or similar mapping or location coordinates.

It should be understood that the location of the wireless device may be determined using well-known methods such as triangulation, GPS, E-911, etc.

Triangulation is a method of locating the source of a radio signal through the use of three receivers (such as cell towers) each of which focuses on the direction of maximum signal strength. Through the use of three receivers, it is possible to plot the location of the transmitter (the wireless device). Of course, the accuracy of triangulation may be affected by the radio signals bouncing off of and being absorbed by physical obstructions such as buildings and trees. Triangulation may also be referred to as angle of arrival. This process can also be accomplished using one or two receivers employing smart antenna technology.

Global Positioning System (GPS) is a system that precisely determines a location anywhere on earth. The GPS comprises around twenty satellites orbiting the earth. GPS is based on satellite ranging. Satellite ranging determines the position of a GPS device by measuring the distance of the GPS device from a group of satellites in space. The satellites act as precise reference points. To determine the precise position, latitude, longitude and altitude (and possible velocity), a fix with at least four satellites is required.

In a preferred embodiment, each GPS satellite transmits on two frequencies: 1575.42 MHz (referred to as L1) and 1227.60 MHz (referred to as L2). Along with other data, the satellite transmits its own position, time and a pseudo random noise code (PRN). The PRN is used by the receiver to calculate range. If the locations of several satellites are known and the precise range of the GPS device from these satellites, then the location and altitude of the GPS device may be determined. The satellites derive time from on-board celestial navigation equipment and atomic clocks accurate to one second in 300,000 years.

The ranging of the GPS device may function as follows. The GPS device and the satellites include a long sequence of bits. By aligning and comparing an internal stream of bits in the GPS device to the received bits from the satellite, a shift error or displacement can be calculated representing the travel time from the satellite to the GPS device. Because the GPS device also knows the precise location of the satellite and the range from the satellite to the GPS device, a triangulation calculation may provide two dimensional position (latitude and longitude) from three satellites. If a fourth satellite is used, elevation information may be obtained.

There are actually two PRN strings transmitted: a course acquisition code (C/A code) and a precision code (P code). The coarse code sequence comprises 1023 bits repeated every 266 days. However, each satellite transmits a seven day segment re-initialized at midnight Saturday or Sunday of each week. By using both codes, a very accurate position can be calculated. By transmitting the codes at different frequencies, even the signal attenuating effects of the ionosphere can to some degree be factored out. At the present time, civilian users are only authorized to use the coarse acquisition code and this is referred to as the GPS Standard Positioning System (SPS) with an accuracy of about 5 meters. Military users use both the coarse acquisition code and the precision code in what is referred to as the Precise Positioning System (PPS) with an accuracy to centimeters.

Although triangulation and GPS may be used to provide location information, other well-known locating techniques may also be used. For example, location may also be provided using the automatic location information (ALI) provided for E-911 service.

After the location of the wireless device is received from the wireless network using one of the above-described techniques or another known technique, the server may then use the user's location to store commute statistics. Commute statistics are typically stored as a user identifier, a time stamp and location information. The commute statistics may be used to determine how long it typically takes to get from point A to point B. The commute statistics may be based on a particular user, such as how long does it take user A to get from point A to point B. Alternatively, the commute statistics may be based on a group of users, such as how long does it take an average user of group A to get from point A to point B.

Based on these commute statistics, the server may perform calculations such as determining how long it will take the user to get to their next scheduled appointment. Based on this information, late messages may be sent to appropriate parties, appointments may be reschedules, alternative routes may be suggested to the user, etc.

Figure 2:
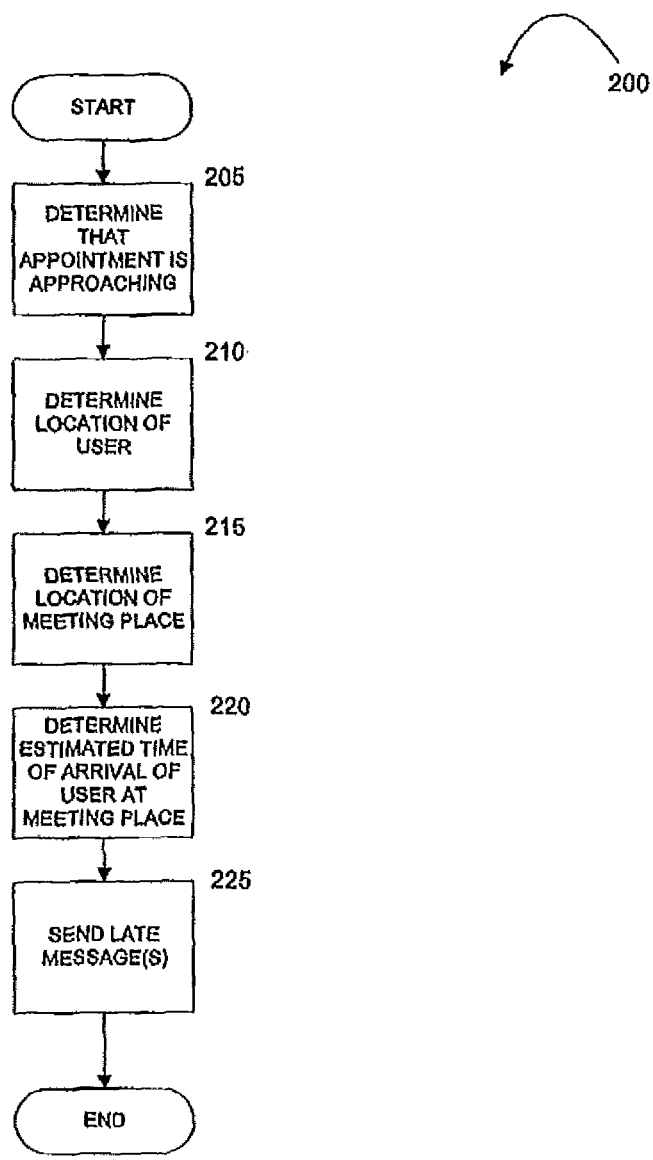
FIG. 2 is a flow diagram illustrating method for providing location-sensitive and time-sensitive calendaring to a wireless device in accordance with an embodiment of the present invention.

Having described an exemplary operating environment in reference to FIG. 1, a flow diagram illustrating a method 200 for providing location-sensitive and time-sensitive calendaring to a wireless device in accordance with an embodiment of the present invention will be described in reference to FIGS. 1 and 2. It should be understood that the steps described herein in reference to flow diagrams are steps executed by a computer in response to instructions received from a computer-readable medium.

The method 200 begins at step 205 where it is determined that a user's appointment is approaching. For example, in one embodiment, it may be determined that a time reading (the present time) is within a predetermined minimum of a meeting start time of an appointment of a calendar of a user. The appointment may comprise a meeting start time, a meeting place and a plurality of meeting attendees. Typically, the calendar information may be stored in server 130 and/or database 145. The server 130 may determine the approaching appointments based on this stored information.

At step 210, the location of the user associated with the approaching appointment is determined. Typically, either in the database 145 or server 130, will be a file with the wireless device(s) associated with a user. Thus, if user A is associated with a cell phone with directory number 555-555-5555, then the server will request that the wireless network 105 determine the location of user A based on the location of the wireless device associated with user A (the cell phone with directory number 555-555-5555).

At step 215, the location of the meeting place is determined. A plurality of meeting places and their location coordinates may be stored in database 145 and/or server 130. For example, if the user enters "Plaza Hotel" into his calendar for the meeting place, then a database may cross-reference the meeting place Plaza Hotel with its location coordinates (such as its street address, latitude/longitude, etc.) Alternatively, the user may directly enter the location of the meeting place when entering the appointment into his calendar.

At step 220, the estimated time of arrival of the user at the meeting place is determined. The estimated time of arrival may be determined using historical data. For example, by collecting data from different wireless devices (either those of the user or those of other users), the server may maintain a database of historical data. Typically, the historical data may comprise a user identifier, a time stamp and a location identification. The server may use the historical data to perform calculations, such as determining the average commute time between two different locations. These calculations may be performed based on a particular user (such as how long does it typically take user 1 to get from point A and point B). Alternatively, the calculations may be performed based on multiple users (such as, one average, how long does it take someone to get from point A to point B). The historical data may also be obtained from a third party, such as a traffic source, which tracks the traffic trends in a city. It should also be understood that, in some embodiments, an indication may be stored as to whether the user is traveling by foot, bicycle, motorcycle, car, train, etc. so that an accurate estimated time of arrival may be calculated. This mode of transportation indication may be set by the user at their computer (135 or 140). Alternatively, the user may set an indication on their wireless device to indicate their mode of transportation and the indication may be transmitted back to the server 130.

The estimated time of arrival may also be calculated based on the velocity of the user. The velocity may sometimes be calculated using GPS and other means. Thus, the velocity of the user, the user's current location and the meeting location may be used to determine an estimated time of arrival at the meeting location.

At step 225, if the estimated time of arrival is after the meeting start time, then a late message may be sent. The method 200 then ends. The late message may be sent to the user and/or to the plurality of meeting attendees. For example, a message may be sent to the user indicating that his estimated time of arrival is after the meeting start time and asking the user whether he wants to send a message to the other meeting attendees. If so, then a message is sent to the other meeting attendees.

Typically, the late message will be a SMS message or another type of text message. Alternatively, the message may be a voice message. To send the message, the server locates the wireless device(s) associated with the user and the meeting attendees. Typically, this information is stored in a database, such as database 145. The server connects to the wireless network through conventional means and the wireless network sends the message to the appropriate wireless device. For example, the server may send an e-mail message to the pager service provider of the user. The e-mail message indicates the estimated time of arrival of the user at the meeting. The pager service provider then sends the page to the user.

In alternative embodiments of the present invention, a roll call mechanism may be implemented. The roll call mechanism would allow a user to send out a roll call request for a meeting. The server would then determine all of the meeting attendees and, through requests to the wireless network, the server would determine the location of all the attendees for the meeting. The server may send the location of all meeting attendees to the user. Alternatively, the server may perform calculations to determine the estimated times of arrival for each of the meeting attendees and the server may send estimated times of arrival to the user and/or all of the meeting attendees.

In another embodiment, the invention may be connected to a mapping program to provide a map to be displayed to the user. The server may be able to determine the user's location, the closest appointment for the user and which route will get the user there on time. Determining the closest appointment may be particularly important for service calls, which is a particular use of an embodiment of the present invention. Thus, a service representative will be sent to the closest appointments and will be notified via their wireless device which appointment is next. The customer may receive a page, an e-mail, a telephone call, etc. notifying the customer where the service representative is and the estimated time of arrival of the service representative.

In another embodiment, the invention may be able to automatically enter the meeting location based on the user's present location. For example, suppose a user is at a meeting at The Plaza Hotel. If the user enters a new appointment into their wireless device, such as a PDA, the default meeting location may be entered as The Plaza Hotel based on the location information received by the server.

In another embodiment, the present invention may automatically reschedule an appointment if the user is going to be late and send notifications to the user and the other meeting attendees of the new meeting time. This is particularly effective because preferably the server controls the calendars of the user and the meeting attendees.

Although the present invention has been described above as implemented in a preferred environment and using preferred methods, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method, comprising:
calculating, by a server, estimated times of arrival of multiple wireless communication devices at a location of an appointment, as a start time of the appointment approaches, based upon respective locations and velocities of the wireless communication devices, wherein the respective locations of the wireless communication devices are received by the server responsive to a roll call request sent from the server to the wireless communication devices;
determining, by the server, that one of the estimated times of arrival is after the start time of the appointment; and
rescheduling the appointment, by the server, in response to determining that the one of the estimated times of arrival is after the start time of the appointment.

2. The method of claim 1, wherein calculating the estimated times of arrival at the appointment location is further based upon historical data.

3. The method of claim 2, wherein the historical data comprises time stamps, corresponding to the locations of the wireless communication devices, and corresponding location coordinates for each wireless communication device, and the estimated times of arrival at the appointment location are calculated based upon differences between the time stamps corresponding to the locations of the wireless communication devices and a time stamp corresponding to the appointment location.

4. The method of claim 2, wherein the historical data comprises a historical commute time from the location of each wireless communication device to the appointment location.

5. The method of claim 4, wherein the historical commute time from the location of each wireless communication device to the appointment location is based on average commute times from the location of each wireless communication device to the appointment location.

6. The method of claim 1, further comprising providing, from the server, a notification to one of the wireless communication devices indicating a start time of the rescheduled appointment.

7. The method of claim 1, wherein calculating the estimated times of arrival is further based upon an indication of a mode of transportation of each of the wireless communication devices.

8. A tangible computer readable storage medium comprising instructions that, when executed by a processor, cause the processor to perform operations comprising:

calculating estimated times of arrival of multiple wireless communication devices at location of an appointment, as a start time of the appointment approaches, based upon respective locations and velocities of the wireless communication devices, wherein the respective locations of the wireless communication devices are received from the wireless communication devices responsive to a roll call request to the wireless communication devices;

determining that one of the estimated times of arrival is after the start time of the appointment; and rescheduling the appointment in response to determining that the one of the estimated times of arrival is after the start time of the appointment.

9. The tangible computer readable storage medium of claim 8, wherein the estimated times of arrival are further calculated based upon historical data.

10. The tangible computer readable storage medium claim 9, wherein the historical data comprises time stamps, corresponding to the locations of the wireless communication devices, and corresponding location coordinates for each wireless communication device, and the estimated times of arrival at the appointment location are calculated based upon differences between the time stamps corresponding to the locations of the wireless communication devices and a time stamp corresponding to the appointment location.

11. The tangible computer readable storage medium of claim 9, wherein the historical data comprises a historical commute time from the location of each wireless communication device to the appointment location.

12. The tangible computer readable storage medium of claim 11, wherein the historical commute time from the location of each wireless communication device to the appointment location is based on average commute times from the location of each wireless communication device to the appointment location.

13. The tangible computer readable storage medium claim 8, wherein the estimated times of arrival are further calculated based upon an indication of a mode of transportation of each of the wireless communication devices.

14. A device, comprising:

a processor;

a memory, in communication with the processor, the memory having instructions stored thereon that, when executed by the processor, cause the processor to perform operations comprising:

calculating estimated times of arrival of multiple wireless communication devices at a location of an appointment as a start time of the appointment approaches, based upon respective locations and velocities of the wireless communication devices, wherein the respective locations of the wireless communication devices are received from the wireless communication devices responsive to a roll call request sent to the wireless communication devices;

determining that one of the estimated times of arrival is after the start time of the appointment; and rescheduling the appointment in response to determining that the one of the estimated times of arrival is after the start time of the appointment.

15. The device of claim 14, wherein calculating the estimated times of arrival at the appointment location is further based upon historical data.

16. The device of claim 15, wherein the historical data comprises time stamps, corresponding to the locations of the wireless communication devices, and corresponding location coordinates for each wireless communication device, and the estimated times of arrival at the appointment location are calculated based upon differences between the time stamps corresponding to the locations of each wireless communication device and a time stamp corresponding to the appointment location.

17. The device of claim 15, wherein the historical data comprises a historical commute time from the location of each wireless communication device to the appointment location.

18. The device of claim 17, wherein the historical commute time from the location of each wireless communication device to the appointment location is determined based on average commute times from the location of each wireless communication device to the appointment location.

19. The device of claim 14, wherein a notification is provided to one of the wireless communication devices indicating a start time of the rescheduled appointment.

20. The device of claim 14, wherein calculating the estimated times of arrival at the appointment location is further based upon an indication of a mode of transportation of each of the wireless communication devices.

* * * * *